United States Patent

[11] 3,545,425

[72] Inventors Gary L. Dikin
Warren;
Alan F. Karpus, Detroit, Michigan
[21] Appl. No. 765,899
[22] Filed Oct. 8, 1968
[45] Patented Dec. 8, 1970
[73] Assignee Insto-Gas Corporation
Detroit, Michigan
a corporation of Michigan

[54] INFRARED HEATER
10 Claims, 4 Drawing Figs.

[52] U.S. Cl. .................................................. 126/92,
431/328, 431/347
[51] Int. Cl. ...................................................... F23d 13/12,
F24c 3/04
[50] Field of Search .......................................... 126/92,
92(RC), 92(B), 93; 431/328, 329, 343, 344, 347

[56] References Cited
UNITED STATES PATENTS
| | | | |
|---|---|---|---|
| 3,203,413 | 8/1965 | Hartzell et al. ................ | 126/92B |
| 3,237,679 | 3/1966 | Best ............................ | 431/347X |
| 3,291,115 | 12/1966 | Forniti ......................... | 126/92B |
| 3,315,656 | 4/1967 | Eichenlaub ................... | 126/92B |
| 3,329,139 | 7/1967 | Vezzoli ........................ | 431/328X |

Primary Examiner—Charles J. Myhre
Attorney—Whittemore, Hulbert & Belknap

ABSTRACT: A space heater for patios and the like having a gas-operated heating element within the housing and a grid providing a multiplicity of passages for the entry of air to the housing. The grid is disposed at a substantial angle to the heating element to prevent the heating element from being extinguished by direct impingement of the entering air.

PATENTED DEC 8 1970

3,545,425

INVENTORS
GARY L. DIKIN
ALAN F. KARPUS

BY Whittemore, Hulbert & Belknap

ATTORNEYS

3,545,425

INFRARED HEATER

SUMMARY OF THE INVENTION

It is a primary object of this invention to provide a gas-operated space heater constructed so as to prevent the heating element from being extinguished by direct impingement of the entering air.

Another object is to provide a space heater having a grid providing a multiplicity of passages for the entry of air to the housing, the grid being disposed at a substantial angle to the heating element.

Another object is to provide a space heater having the grid disposed at an angle to the heating element within the range of approximately 68° to 90°, and preferably on the order of approximately 68°.

Another object is to provide a space heater in which the heating element is a gas-operated infrared heating plate.

Another object is to provide a space heater in which the grid is a honeycomb member having air passages extending at right angles to the plane of the honeycomb member.

Another object is to provide a space heater having the infrared radiant heating plate adjacent to the back wall of the housing, the grid covering a bottom opening to the housing forwardly of the back wall, and the top wall having a portion sloping downward direction and terminating adjacent the front edge of the grid.

Other objects and features of the invention will become apparent as the description proceeds, especially when considered in conjunction with the accompanying drawing wherein.

Figure 1:
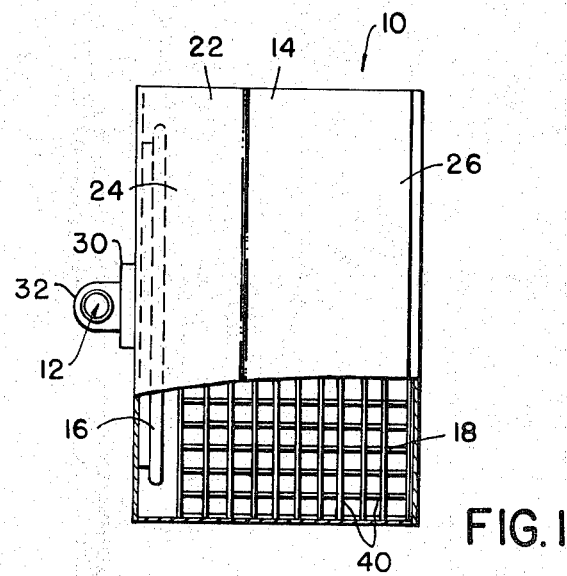
FIG. 1 is a top plan view with parts broken away of a space heater for patios and the like constructed in accordance with our invention.
Figure 4:
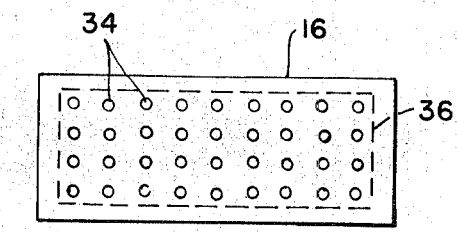
FIG. 4 is a detail view of the heating plate taken substantially on the line 4—4 of FIG. 2.

The space heater of our invention is particularly adapted for domestic use as a patio heater for example, but obviously could be used for many other purposes both at home and in industry.

As shown, the heater designated 10 is mounted on a post 12 which may be anchored in the ground preferably in a patio area. The heater 10 comprises a housing 14, an infrared heating element 16 mounted in fixed position within the housing, and a grid 18 providing a multiplicity of passages for the entry of air into the housing. The housing includes a vertical back wall 20, and a top wall 22 having a horizontal rear portion 24 and a downwardly and forwardly sloping front portion 26. There is a bottom opening to the housing which is covered by the grid 18 shown as being inclined upwardly in a forward direction and joined at its front edge to the front edge of the sloping portion 26 of the top wall.

A mounting bracket 30 on the outside of rear wall 20 of the housing has a sleeve 32 embracing the post 12. The sleeve 32 may be permanently secured in fixed position upon the post 12 at the desired elevation, or it may be slidable upon the post and adapted to be secured in adjusted position by means of a setscrew for example. In any event, the housing 10 obviously will be maintained in fixed position at the desired elevation on the post 12 when in use.

The heating element 16 is preferably a ceramic type infrared radiant heating plate of more or less standard construction which is heated to incandescence when operated. The plate has numerous openings 34 in the front surface communicating with the manifold 36 at the rear. The heating element is secured in fixed position within the housing upon the rear wall, and a gas line conduit 38 which may extend through the hollow post 12 communicates with the manifold 36 to supply gas to the heating element. Preferably the heating element is secured to the rear wall of the housing in a position such that the plane of the ceramic plate is parallel to the plane of the rear wall which as noted is preferably disposed in vertical position when mounted on the post 12.

The honeycomb grid 18 is made up of a plurality of crossing strips 40 which defines an open cellular structure providing a multiplicity of passages for the entry of air to the housing. The strips 40 defining the cellular structure are of a substantial width or height so as to provide air entry passages of a significant length as will be apparent in FIG. 2, such passages being disposed at right angles to the plane of the grid.

The angle between the planes of the ceramic heating plate 16 and of the grid 18 is important. This angle is within the range of approximately 68°—90°, and preferably is on the order of about 68°.

Figure 2:
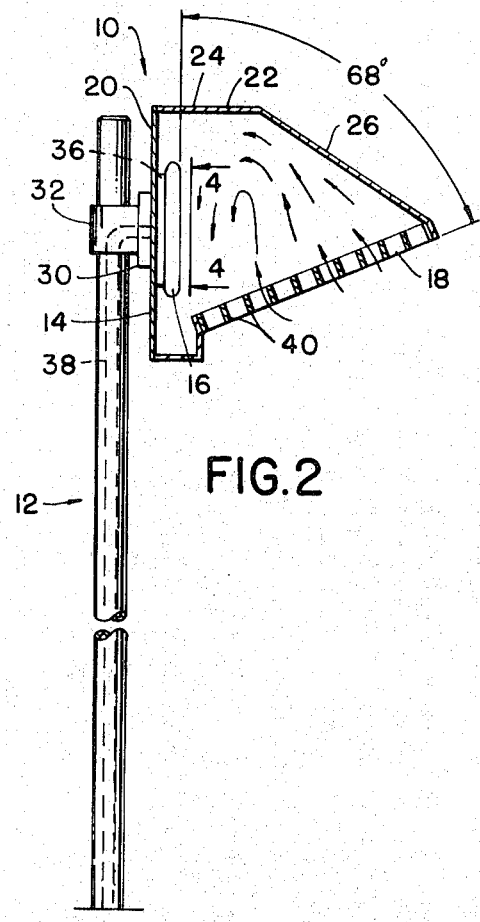
FIG. 2 is a side elevational view with parts in section of the space heater shown in FIG. 1.
Figure 3:
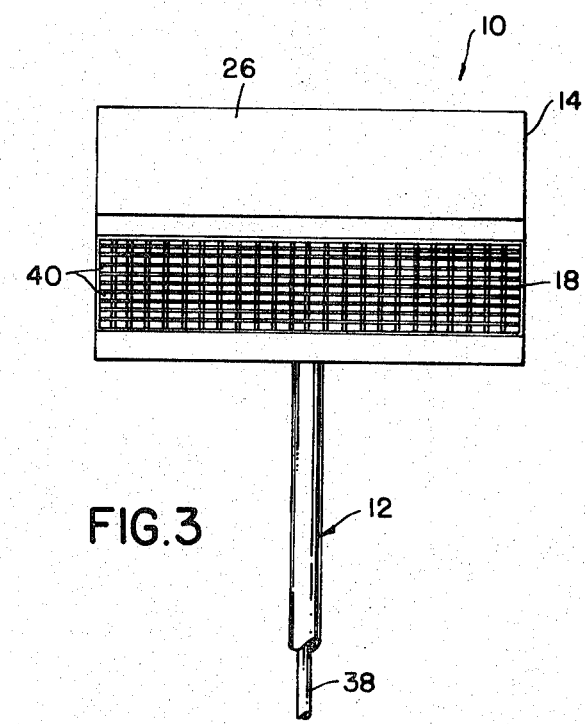
FIG. 3 is a fragmentary front elevational view.

The arrows in FIG. 2 trace the flow pattern of air as it enters and as it circulates within the housing. As there shown, the entering air is directed substantially at right angles to the plane of the grid 18 by the cells of the grid as it enters the housing. The entering air then flows in an upward and rearward direction and is further directed rearwardly and downwardly by the top wall 22 of the housing, and particularly the forward portion 26 thereof. The downward flow of deflected air within the housing passes across the front face of the ceramic heating plate 16 preferably substantially parallel thereto so as not to extinguish the flame. Thus the entering air is prevented from impinging directly upon the face of the heating plate at a substantial angle. Direct impingement of air on the heating plate can extinguish the heater.

It will be understood that while preferably the housing is disposed in the substantially upright position shown in FIG. 2 with the rear wall 20 in vertical position, it may in some instances be tilted from the position shown by rotation through a small angle in a counterclockwise direction. This would in no way however change the relationship of the various parts of the heater to each other, such as the angular relationship between the heating element and the grid.

We claim:

1. A space heater, comprising a housing, a gas-operated heating element within said housing, an air opening to the interior of said housing, and a grid covering said opening having a multiplicity of air passages therethrough, said grid being disposed at a substantial angle to said heating element on the order of approximately 68°.

2. A space heater for patios and the like, comprising a housing defining an interior space having a back wall and a top wall projecting forwardly from said back wall, a bottom opening to said space forwardly of said back wall and beneath said top wall, a gas-operated infrared heating plate within said space adjacent said back wall, and a grid covering said opening having a multiplicity of air passages therethrough, said grid being disposed at a substantial angle to said heating plate.

3. The heater defined in claim 2, wherein said air passages extend at right angles to the plane of said grid.

4. The heater defined in claim 3, wherein said grid is disposed at an angle to said heating plate within a range of approximately 68°—90°.

5. The heater defined in claim 3, wherein said grid is disposed at an angle to said heating plate on the order of approximately 68°.

6. The heater defined in claim 5, wherein said heating plate is generally upright, and said grid extends forwardly from said heating plate at an upward incline.

7. The heater defined in claim 6, wherein said top wall has a forward portion sloping downward in a forward direction and terminating adjacent the forward edge of said grid.

8. A space heater, comprising a housing, a gas-operated heating element within said housing, an air opening to the interior of said housing, and a grid covering said opening having a multiplicity of air passages therethrough, said grid being disposed at a substantial angle to said heating element within the range of approximately 68°90°.

9. A space heater, comprising a housing, an air opening to the interior of said housing, a grid covering said opening having a multiplicity of air passages therethrough, and a gas-operated heating element within said housing, said heating element being offset laterally from a position directly behind said grid so as not to be subjected to the direct impingement of air entering said housing through said passages.

10. A space heater, comprising a housing, an air opening to the interior of said housing, a grid covering said opening having a multiplicity of air passages therethrough, and a gas-operated heating element within said housing, the axes of said air passages being disposed at a substantial angle to said heating element.